(12) United States Patent
Purohit et al.

(10) Patent No.: US 9,068,396 B2
(45) Date of Patent: Jun. 30, 2015

(54) ANTI-STALL MECHANISM

(71) Applicant: HALLIBURTON ENERGY SERVICES, INC., Houston, TX (US)

(72) Inventors: Ankit Purohit, Pune (IN); Anand Bhagwat Kedare, Pune (IN); Mukesh Bhaskar Kshirsagar, Pune (IN); Sandip Satish Sonar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/365,248

(22) PCT Filed: Aug. 23, 2013

(86) PCT No.: PCT/US2013/056499
§ 371 (c)(1),
(2) Date: Jun. 13, 2014

(87) PCT Pub. No.: WO2015/026374
PCT Pub. Date: Feb. 26, 2015

(65) Prior Publication Data
US 2015/0083541 A1 Mar. 26, 2015

(51) Int. Cl.
*F16D 11/16* (2006.01)
*E21B 4/00* (2006.01)
(Continued)

(52) U.S. Cl.
CPC ... *E21B 4/00* (2013.01); *E21B 4/06* (2013.01); *E21B 17/02* (2013.01); *E21B 17/046* (2013.01); *E21B 19/16* (2013.01); *F16D 11/16* (2013.01); *F16D 43/04* (2013.01)

(58) Field of Classification Search
CPC ......... F16D 43/14; F16D 43/16; F16D 11/16; F16D 2011/006; F16D 3/00; F16D 3/20; F16D 3/50; F16D 3/64; F16D 7/00; F16D 7/04; F16D 7/048; F16D 43/04; F16D 43/202; F16D 43/2028; F16D 43/22; F16D 43/24; E21B 4/006; E21B 4/02
See application file for complete search history.

(56) References Cited

U.S. PATENT DOCUMENTS 1,727,276 A 9/1929 Diehl
2,167,019 A 7/1939 Yost
(Continued)

OTHER PUBLICATIONS

International Search Report and Written Opinion of the International Searching Authority issued in International Application No. PCT/US2013/056499 on May 22, 2014; 9 pages.
(Continued)

*Primary Examiner* — Jacob S Scott
*Assistant Examiner* — Tinh Dang
(74) *Attorney, Agent, or Firm* — Anthony Iannitelli; Fish & Richardson P.C.

(57) ABSTRACT

The subject matter of this specification can be embodied in, among other things, a locking clutch that includes a collection of movable locking blocks slidably coupled to the rotatable output shaft. The movable locking blocks slide radially inwardly and outwardly with respect to a central longitudinal axis of the rotatable output shaft, and are spaced apart circumferentially about the rotatable output shaft, with each movable locking block having a first contacting face and a second contacting face. A collection of fixed locking blocks are coupled to the rotatable housing, and are positioned radially around the output shaft and spaced apart circumferentially about the interior of the rotatable housing a distance sufficient to receive one of the movable locking blocks when it moves inwardly toward the central axis of the rotatable output shaft, each said fixed locking block having a first contacting face and a second contacting face.

16 Claims, 14 Drawing Sheets

(51) Int. Cl.
*F16D 43/04* (2006.01)
*E21B 4/06* (2006.01)
*E21B 17/02* (2006.01)
*E21B 17/046* (2006.01)
*E21B 19/16* (2006.01)

(56) References Cited

U.S. PATENT DOCUMENTS

| | | | |
|---|---|---|---|
| 3,461,746 A * | 8/1969 | Schwerdhofer | 475/258 |
| 4,295,535 A | 10/1981 | Crase et al. | |
| 5,172,776 A | 12/1992 | Wilschek | |
| 6,073,741 A | 6/2000 | Liu | |
| 6,148,979 A | 11/2000 | Roach et al. | |
| 6,182,774 B1 | 2/2001 | Tibbits | |
| 6,478,129 B2 | 11/2002 | Lambertini | |
| 6,588,542 B2 * | 7/2003 | Nakajima et al. | 181/102 |
| RE38,498 E | 4/2004 | Ruth et al. | |
| 6,796,414 B2 | 9/2004 | Hu et al. | |
| 6,905,319 B2 | 6/2005 | Guo | |
| 7,121,391 B2 | 10/2006 | Kuo | |
| 7,377,337 B2 | 5/2008 | Swietlik et al. | |
| 7,448,481 B2 * | 11/2008 | Kimes et al. | 192/46 |
| 7,703,550 B2 | 4/2010 | Nevlud et al. | |
| 7,735,581 B2 * | 6/2010 | Beylotte et al. | 175/101 |
| 8,074,742 B2 | 12/2011 | Scott et al. | |
| 8,365,842 B2 * | 2/2013 | Hall et al. | 175/268 |
| 8,776,915 B2 * | 7/2014 | Beylotte et al. | 175/101 |
| 2008/0093127 A1 | 4/2008 | Angman | |
| 2008/0264692 A1 | 10/2008 | Underwood et al. | |
| 2009/0095528 A1 * | 4/2009 | Hay et al. | 175/26 |
| 2009/0173489 A1 | 7/2009 | Bullard | |
| 2010/0212966 A1 * | 8/2010 | Hall et al. | 175/106 |
| 2010/0314172 A1 | 12/2010 | Underwood et al. | |
| 2011/0192612 A1 | 8/2011 | Swietlik | |
| 2011/0214963 A1 * | 9/2011 | Beylotte et al. | 192/106 R |
| 2012/0111686 A1 * | 5/2012 | Peterson | 192/46 |

OTHER PUBLICATIONS

Kapoh et al., "New Locking Clutch Turbine Technology Successfully Frees Stuck Bit/BHA in Deep Gas Wells, Oman," SPE/IADC 144901, Middle East Drilling Conference and Exhibition in Muscat, Oman, Oct. 24-26, 2011, 12 pages.

* cited by examiner

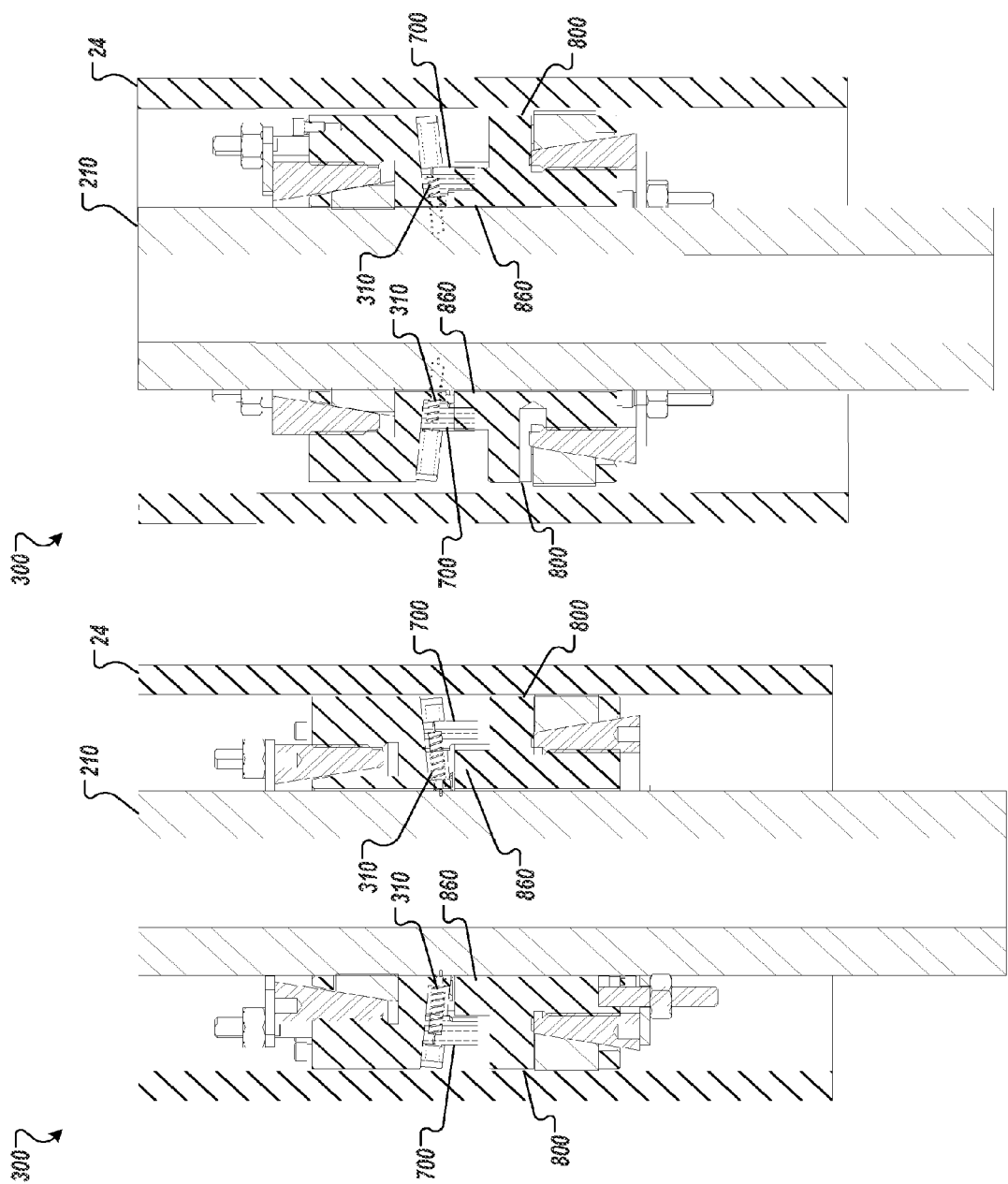

ANTI-STALL MECHANISM

CLAIM OF PRIORITY

This application is a US National Stage of PCT/US 2013/056499 filed on Aug. 23, 2013.

TECHNICAL FIELD

The present disclosure relates to systems, assemblies, and methods for an anti-stall mechanism (more particularly a locking clutch) for transmitting rotational torque to a tool string positioned in a wellbore.

BACKGROUND

In oil and gas exploration it is important to protect the operational progress of the drill string and downhole tools connected thereto. In general, a drilling rig located at or above the surface may be coupled to a proximate end of a drill string in a wellbore to rotate the drill string. The surface equipment on the drilling rig rotates the drill string. The drill string includes joints of drill pipe and may include a downhole power section coupled to the drill pipe (e.g., a positive displacement mud motor) that includes a stator and a rotor that are rotated and transfer torque down the borehole to a drill bit or other downhole equipment (referred to generally as the "tool string") coupled to a distal end of the drill string. During normal operation, the surface equipment rotates drill pipe that is coupled to the stator of the mud motor. The rotor is rotated due to a pumped fluid pressure difference across the power section relative to the stator. The rotational speed of downhole components, such as the drill string, power section, tool string, and drill bit, are commonly expressed in terms of revolutions per minute (RPM). As weight on the drill bit or formation resistance to drilling increases, the drill bit speed slows down. When the drill bit speed is equal to or less than the speed of the stator (as may be expressed in RPMs), the power section is referred to as "stalled."

DESCRIPTION OF DRAWINGS

FIG. 13A is a cross-sectional side view of an example anti-stall mechanism in a disengaged configuration.

FIG. 13B is a cross-sectional side view of an example anti-stall mechanism in an engaged configuration.

DETAILED DESCRIPTION

Figure 1:
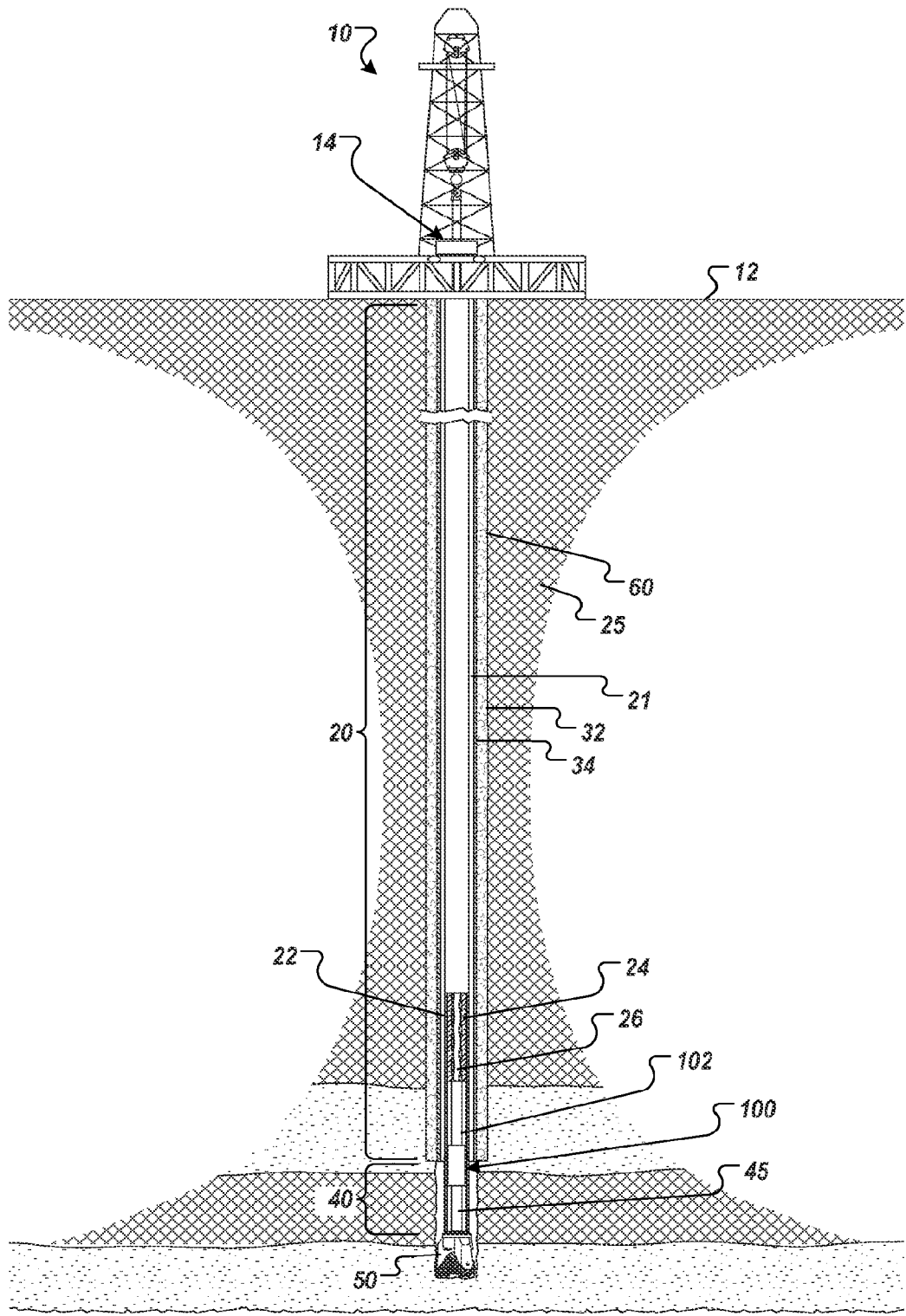
FIG. 1 is a schematic illustration of a drilling rig and downhole equipment including a downhole drilling motor disposed in a wellbore.
Figure 2:
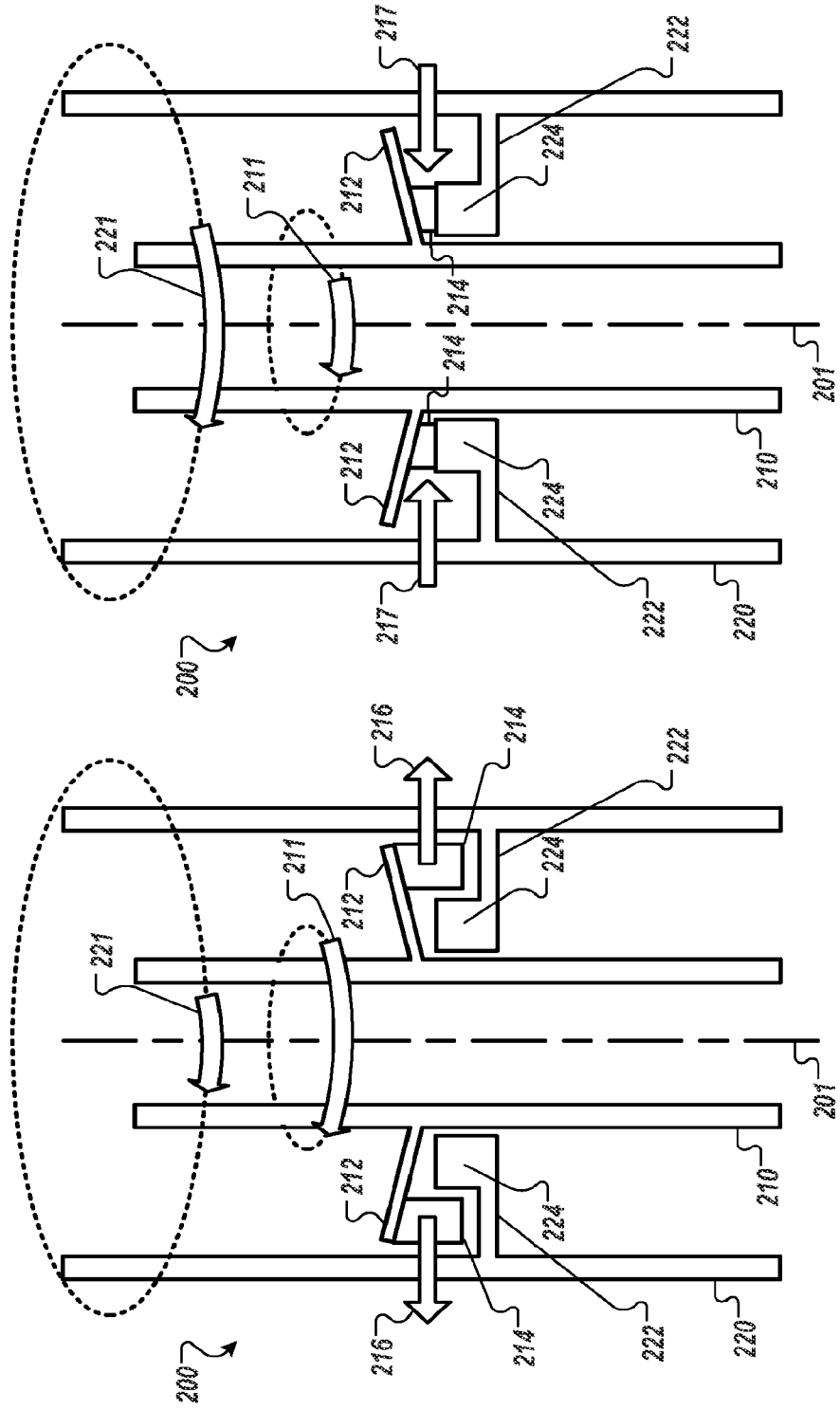
FIGS. 2A and 2B are conceptual diagrams of an example of an anti-stall mechanism.

Referring to FIG. 1, in general, a drilling rig 10 located at or above the surface 12 rotates a drill string 20 disposed in a wellbore 60 below the surface 12. The surface equipment 14 on the drilling rig rotates drill pipe 21. The drill string 20 includes joints of drill pipe 21 and a downhole power section 22 (e.g., a downhole positive displacement motor such as a Moineau type motor), which includes a stator 24 and a rotor 26 that are rotated and transfer torque down the borehole to a drill bit 50 or other downhole equipment (referred to generally as the "tool string") 40 attached to a longitudinal output shaft 45 of the downhole positive displacement motor. The wellbore 60 is reinforced by a casing 34 and a cement sheath 32 in the annulus between the casing 34 and the borehole. During the normal operation, the surface equipment 14 rotates the drill pipe 21 which is coupled to the stator 24, and the rotor 26 is rotated due to a pumped fluid pressure difference across the power section 22 relative to the stator 24 of a downhole positive displacement motor. As weight on the drill bit 50 or formation resistance to drilling increases, and when the torque generated by the power section is insufficient to overcome this resistance, the drill bit 50 speed slows down. When the drill bit 50 speed is equal to or less than the stator 24 RPM, the power section 22 is referred to as "stalled."

At this stage the rotation of the drill bit 50 and the rotor 26 lags behind the rotation of the stator 24, which means the rotor 26 is turning relatively backward with respect to stator 24. During motor stall, the combination of mechanical loading and high pressure fluid erosion can quickly result in serious damage to the elastomer of the stator and can reduce the working life and efficiency of the power section 22.

Is some situations, motor stall may be avoided by providing additional torque to the drill bit 50 in order to cut through the formation that is causing the rotational resistance. In the illustrated example, an anti-stall mechanism 100 (also referred to as a locking clutch) is provided to transmit additional torque from the stator 24 to the drill bit 50.

Under normal operation, the stator 24 and the rotor 26 are substantially rotationally decoupled from each other. Under stall or near-stall conditions, the anti-stall mechanism 100 engages to rotationally couple the stator 24 to an output drive shaft 102 that is driven by the rotor 26 to deliver additional torque to the longitudinal output shaft 45 which is removably secured to the output drive shaft. As resistance decreases, the anti-stall mechanism 100 disengages to substantially decouple the stator 24 from the rotor 26. Although in the descriptions of FIGS. 1-16, embodiments of the anti-stall mechanism 100 are described as being used in conjunction with Moineau-type drilling motors, in some embodiments the anti-stall mechanism 100 can also be used with turbines, turbodrills, or any other appropriate form of rotary power transfer mechanism.

FIGS. 2A and 2B are conceptual diagrams of an example of an anti-stall mechanism 200. In some implementations, the anti-stall mechanism 200 can represent the anti-stall mechanism 100 of FIG. 1. Referring to FIG. 2A, an example of the anti-stall mechanism 200 operating under "normal" conditions is shown. Under "normal" conditions, a driveshaft 210 is rotated about a longitudinal axis 201 at a predetermined speed that is represented by the arrow 211. The driveshaft 210 is generally rotated faster than the speed, represented by an arrow 221, at which a stator 220 is rotated.

A collection of extensions 212 extend radially outward from the driveshaft 210. Each of the extensions supports a moveable locking block 214 in a dovetail slot (not shown) that permits radial movement of the locking block 214. As the driveshaft 210 spins, the moveable locking blocks 214 are urged radially outward by centrifugal forces. This outward movement is partly offset by a centripetal force applied to the moveable locking blocks 214. In some embodiments, the centripetal force may be provided by gravity. For example, the dovetail slots may be inclined relative to the effects of gravity such that gravity will tend to draw the moveable locking blocks 214 downward and radially inward, in some embodiments, the centripetal force may be provided by mechanical components. For example, the moveable locking blocks 214 may be urged radially inward by springs, fluid action, or any other appropriate assembly that can provide a force that can urge the moveable locking blocks 214 radially inward.

When the driveshaft 210 is rotated faster than the predetermined speed, the centrifugal forces are sufficient to overcome the centripetal forces acting upon the moveable locking blocks 214. Under such conditions, the moveable locking blocks 214 will be urged radially outward, as indicated by arrows 216. When the moveable locking blocks 214 are at their substantially extended positions along the dovetail slots, the moveable locking blocks 214 are clear to orbit the axis 201 without contacting a collection of fixed locking blocks 224 supported by a collection of extensions 222 extending radially inward from the stator 220.

Referring now to FIG. 2B, an example of the anti-stall mechanism 200 operating under "stalled" conditions is shown. As the weight on the drill bit 50 is increased, or hard drilling conditions are encountered, the drill bit RPM decreases. At some stage the drill bit 50 speed may become sufficiently slow to consider the Moineau motor as being "stalled". Under "stalled" conditions, the driveshaft 210 is rotated about the longitudinal axis 201 below the predetermined speed represented by the arrow 211. In the illustrated example, the driveshaft 210 is rotated more slowly than the speed at which a stator 220 is rotated, represented by the arrow 221.

When the driveshaft 210 is rotated more slowly than the predetermined speed, the centrifugal forces are insufficient to overcome the centripetal forces acting upon the moveable locking blocks 214. Under such conditions, the moveable locking blocks 214 will be urged radially inward, as indicated by arrows 217. When the moveable locking blocks 214 are at their substantially retracted positions along the dovetail slots (e.g., in substantially the same orbit about the axis 201 as the fixed locking blocks), and the driveshaft 210 is rotating more slowly than the stator 220, the moveable locking blocks 214 will contact the fixed locking blocks 224. Rotational energy from the stator 220 will be transferred from the fixed locking blocks 224 to the moveable locking blocks 214, thereby providing additional rotational energy to the driveshaft 210.

In some implementations, the additional rotational energy transferred from the stator 220 to the driveshaft 210 may provide additional torque to the drill bit 50. For example, the drill bit 50 may be lodged in an unexpectedly hard geological formation, and the additional torque may be sufficient to overcome the resistance of the formation and restart rotation of the drill bit. As the drill bit 50 speed and the driveshaft 210 speed increases, the moveable locking blocks 214 will return to the configuration shown in FIG. 2A.

Figure 3:
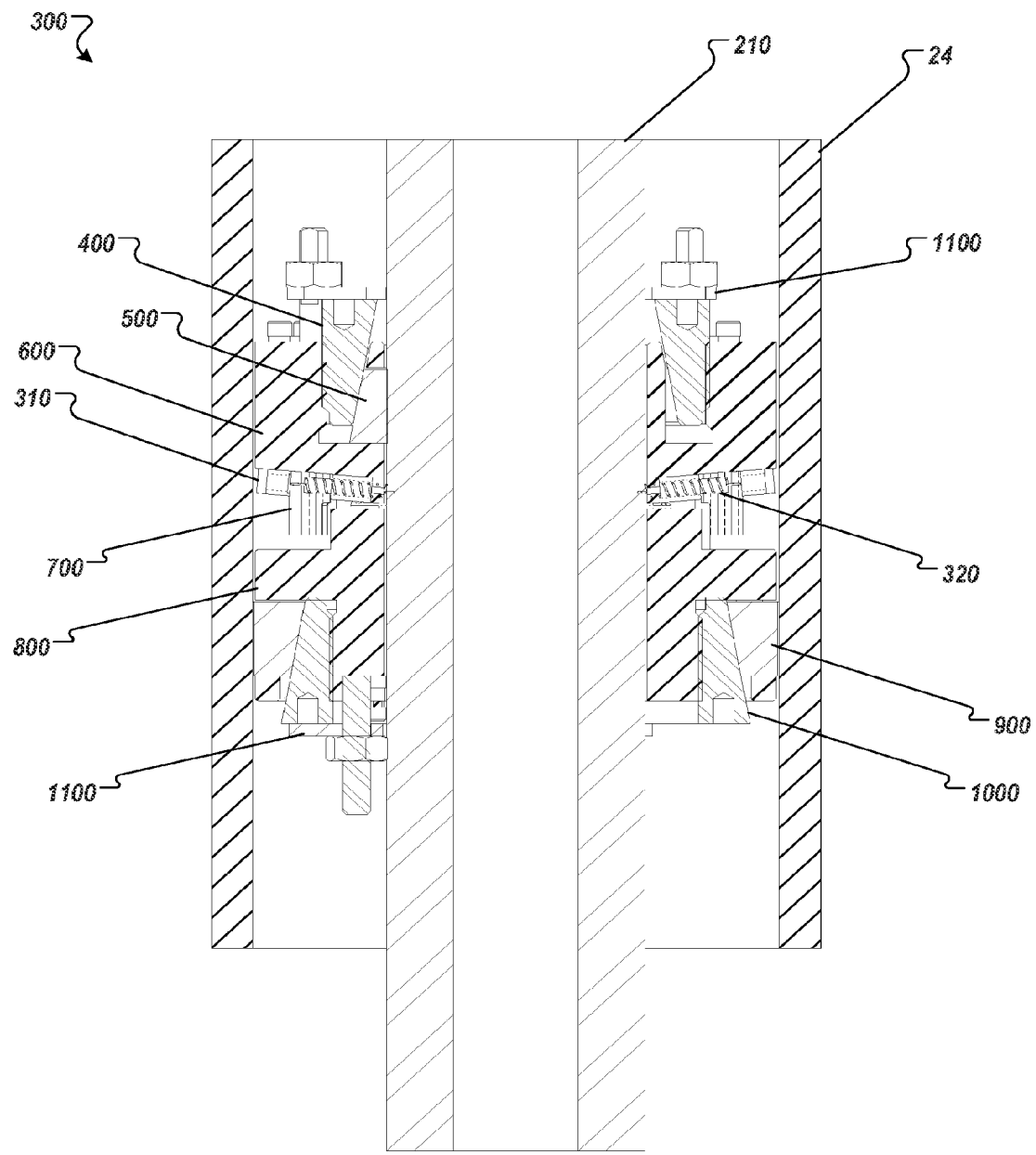
FIG. 3 is a cross-sectional side view of an example anti-stall mechanism.

FIG. 3 is a cross-sectional side view of an example anti-stall mechanism 300. In some implementations, the anti-stall mechanism 300 can be the anti-stall mechanism 100 of FIG. 1. The anti-stall mechanism 300 includes an upper taper disk 400, a collection of upper wicker pads 500, a dovetail disk 600, a collection of stopper pins 310, a collection of springs 320, a collection of moveable locking blocks 700, a locking disk 800, a collection of lower wicker pads 900, a lower taper disk 1000, and a collection of locking assemblies 1100. The components 310-1100 will be discussed further in the descriptions of FIGS. 4-12B.

Figure 4:
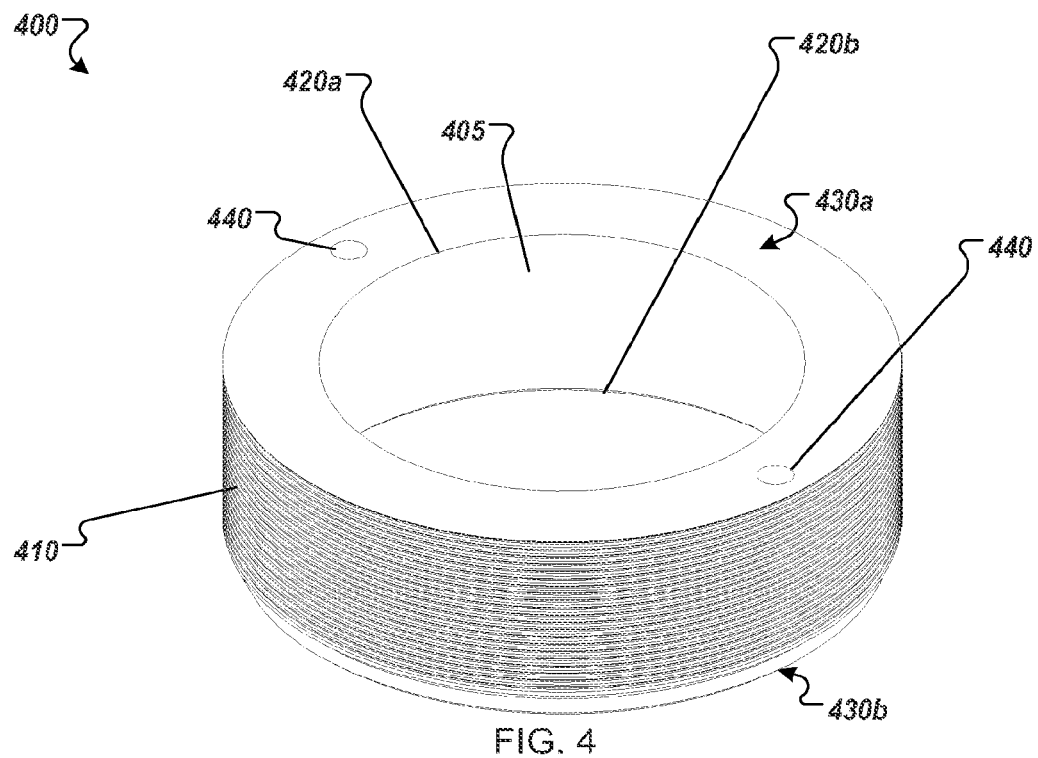
FIG. 4 is a perspective view of an example upper taper disk.

FIG. 4 is a perspective view of the example upper taper disk 400. The upper taper disk 400 is a ring with a collection of threads 410 about its outer diameter. An inner surface 405 of the taper disk is formed with a taper that progresses from a first diameter 420a at a first longitudinal end 430a and a second diameter 420b larger than the first diameter 420a at a second longitudinal end 430b.

The threads 410 are formed to mate with corresponding threads formed in the dovetail disk 600, which will be discussed in the description of FIG. 5. A collection of torque holes 440 are formed in the first longitudinal end 430a. In some implementations, the torque holes 440 may accept the insertion of a tool. For example, a spanner wrench may be inserted into the torque holes to rotate the upper taper disk 400 to thread or unthread the upper taper disk 400 to or from the dovetail disk 600.

Figure 5:
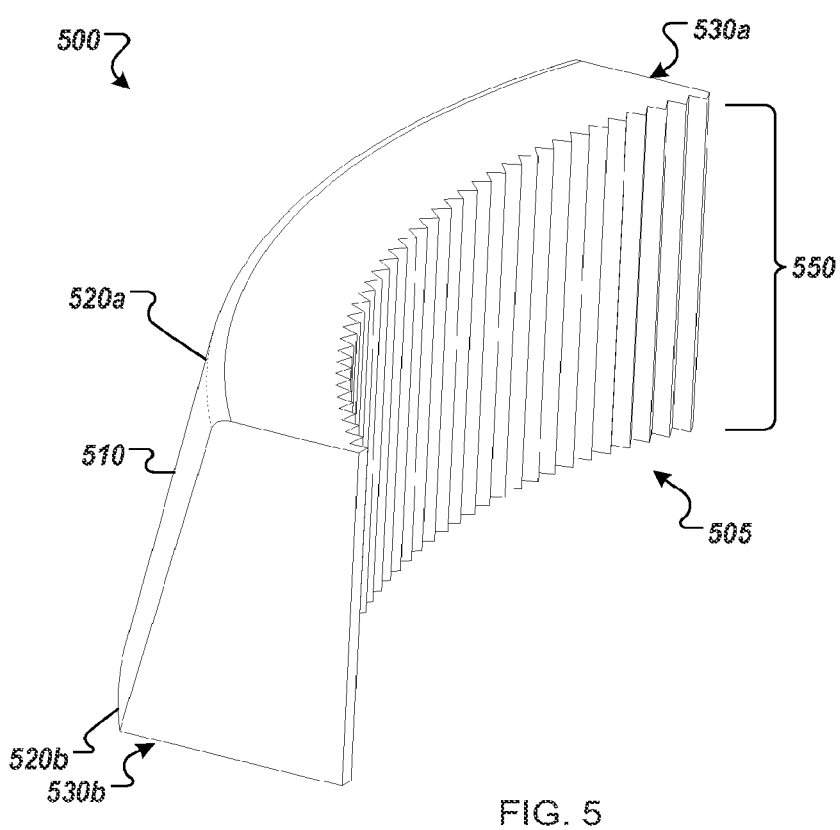
FIG. 5 is a perspective view of an example upper wicker pad.

FIG. 5 is a perspective view of an example of the collection of upper wicker pads 500. The upper wicker pad 500 is a section of a ring having an inner radial surface 505 and an outer radial surface 510. The outer radial surface has a taper from a first diameter 520a and first longitudinal end 530a to a second diameter 520b at a second longitudinal end 530b. The degree of this taper is substantially equal to the taper of the upper taper disk 400. The wicker pad 500 includes a collection of longitudinal wickers 550 on the inner radial surface 505. In use, the longitudinal wickers 550 frictionally engage the driveshaft 210. The longitudinal wickers 550 are compressed against the driveshaft 210 when the upper taper disk 400 is threaded into the dovetail disk 600. In some embodiments, four upper wicker pads 500 may be included in the anti-stall mechanism 300, although any appropriate number may be used.

Figure 6:
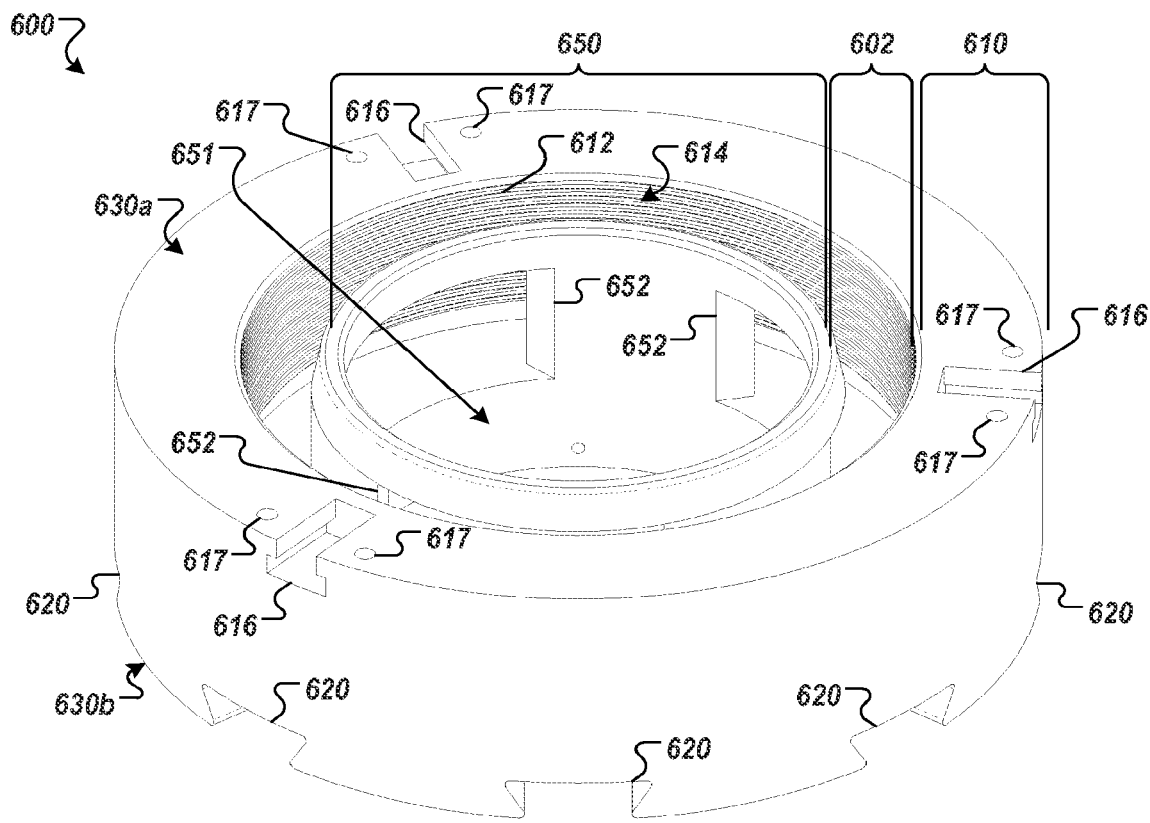
FIG. 6 is a perspective view of an example dovetail disk.

FIG. 6 is a perspective view of the example dovetail disk 600. The dovetail disk 600 is configured as an outer ring 610 arranged concentrically about and connected to an inner ring 650, partly separated by a cavity 602. The outer ring 610 includes a collection of threads 612 about an inner radial surface 614. The threads 612 are configured to accept the threads 410 of the upper taper disk 400 when the upper taper disk 400 is assembled with (e.g., threaded into) the dovetail disk 600.

The inner ring 650 includes a central bore 651 sized to accommodate the driveshaft 210. The inner ring 650 includes a collection of slots 652 arranged radially about the circumference of the inner ring 650. Each of the slots 652 is configured to accommodate one of the upper wicker pads 500. As the upper taper disk 400 is assembled to the dovetail disk 600, the upper wicker pads 500 are compressed between the upper taper disk 400 and the driveshaft 210, causing the longitudinal wickers 550 to frictionally engage the driveshaft 210.

The outer ring 610 includes a collection of locking slots 616 and fastener holes 617 formed in a first longitudinal end 630a. Each of the locking slots 616 and fastener holes 617 are configured to accommodate and removably affix a corresponding one of the locking assemblies 1100, as will be discussed further in the descriptions of FIGS. 11 and 12A.

The outer ring 610 also includes a collection of dovetail slots 620 formed radially about a second longitudinal end 630b. Each of the dovetail slots 620 is configured to accommodate a corresponding one of the moveable locking blocks 700. The dovetail slots 620 are slightly tapered from the outer diameter of the outer ring 610 to a diameter radially inward from the outer diameter. In some embodiments, the taper in the dovetail slots 620 is configured such that when the RPM of the rotor 26 is decreased below a predetermined speed (e.g., low centrifugal force is imparted to the moveable locking blocks 700), the moveable locking blocks 700 can slide radially inward due to gravity, spring force provided by the springs 320, or any other appropriate source of centripetal force.

Figure 7:
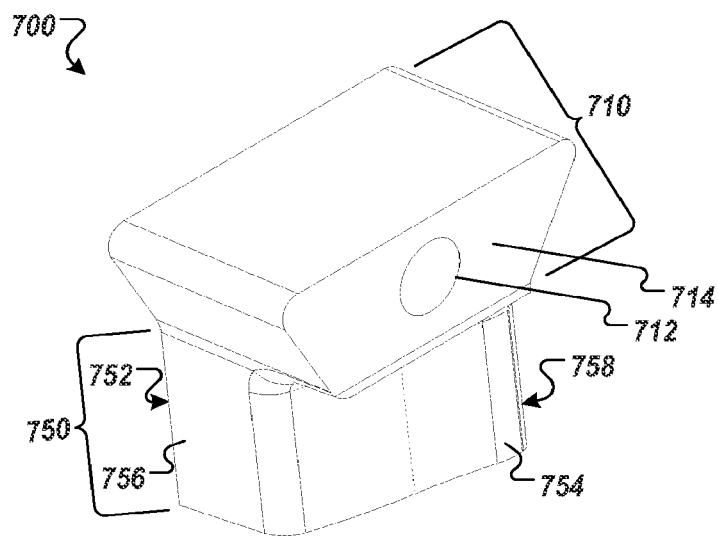
FIG. 7 is a perspective view of an example moveable locking block.

FIG. 7 is a perspective view of an example moveable locking block 700. The moveable locking block 700 includes a dovetail section 710 and a block section 750. The dovetail section 710 is configured to be assembled into, and partly constrained within a corresponding one of the dovetail slots 620 of the dovetail disk 600, e.g., the dovetail shape permits the moveable locking block 700 to partly move along the dovetail slot 620 substantially without rotating or falling out. The dovetail section 710 includes a bore 712 that is substantially parallel to the dovetail and is formed in a radially inward face 714. In use, the bore 712 engages a corresponding one of the springs 320.

The block section 750 is configured with four vertical faces, arranged as a rhombus if viewed in cross-section, including a radially outward face 752, a radially inward face 754, a radially leading face 756, and a radially trailing face 758. The radially trailing face 758 is oriented substantially parallel relative to the orientation of the dovetail section, such that the radially trailing face 758 will be substantially aligned parallel to the path of travel of the moveable locking block 700 in one of the dovetail slots 620. The radially outward face 752 is arranged substantially perpendicular to the radially trailing face 758.

The radially leading face 756 is arranged substantially perpendicular to the radially outward face 752 and substantially parallel to the radially trailing face 758. The radially leading face 756 extends radially inward a lesser distance than the radially trailing face 758. The radially inward face 754 is configured with a taper that extends from the radially trailing face 758 to the radially leading face 756. In some embodiments, the radially leading face 756 and/or the radially inward face 754 may be planar surfaces. In some embodiments, the radially leading face 756 and/or the radially inward face 754 may be planar and/or curved surfaces.

Figure 8A:
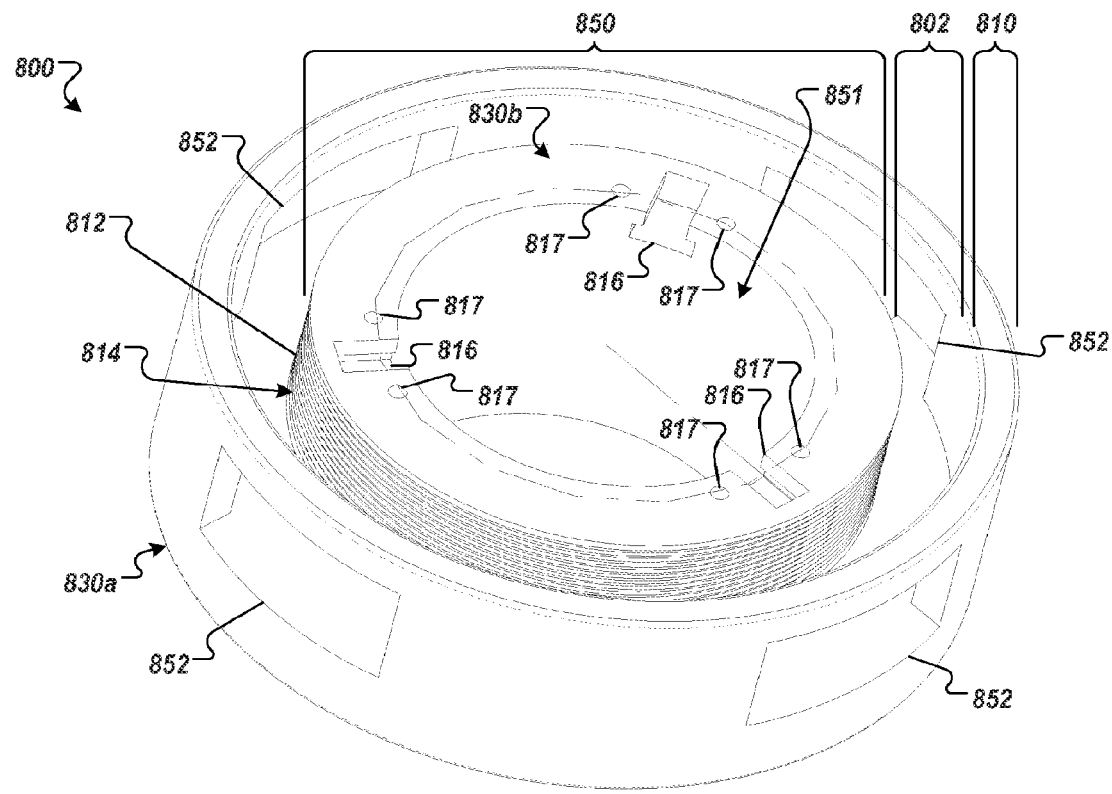
FIGS. 8A, 8B and 8C are perspective views of an example locking disk.

FIG. 8A is a bottom perspective view of the example locking disk 800. The locking disk 800 is configured as an outer ring 810 arranged concentrically about and connected to an inner ring 850, partly separated by a cavity 802. The inner ring 850 includes a collection of threads 812 about an outer radial surface 814.

The inner ring 850 includes a central bore 851 sized to accommodate the driveshaft 210. The inner ring 850 includes a collection of locking slots 816 and fastener holes 817 formed in a second longitudinal end 830b. Each of the locking slots 816 and fastener holes 817 is configured to accommodate and removably affix a corresponding one of the locking assemblies 1100, as will be discussed further in the descriptions of FIGS. 11 and 12A.

The outer ring 810 includes a collection of slots 852 arranged radially about the circumference of the outer ring 810. Each of the slots 852 is configured to accommodate one of the lower wicker pads 900.

Figure 8B:
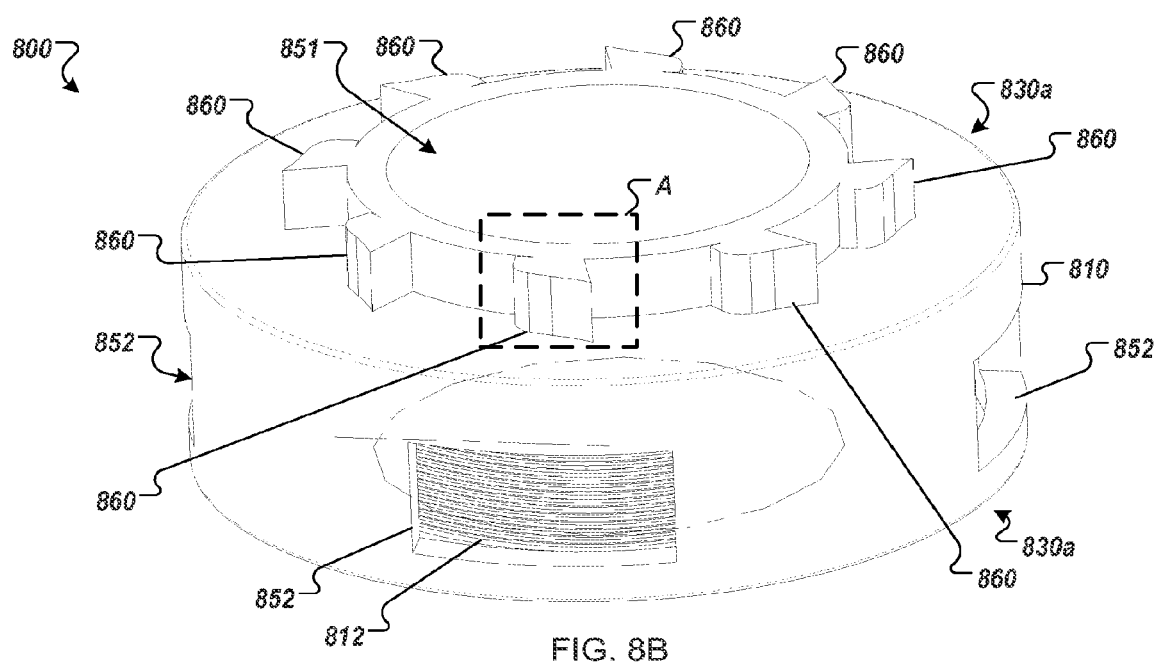

Referring now to FIG. 8B, a top perspective view of the example locking disk 800 is shown. A first longitudinal end 830a includes a collection of fixed locking blocks 860. The collection of fixed locking blocks 860 extend longitudinally out from the first longitudinal surface 830a, and are arranged concentrically about the bore 851. In embodiments, the number of the fixed locking blocks 860 may be equal to the number of moveable locking blocks 700.

Figure 8C:
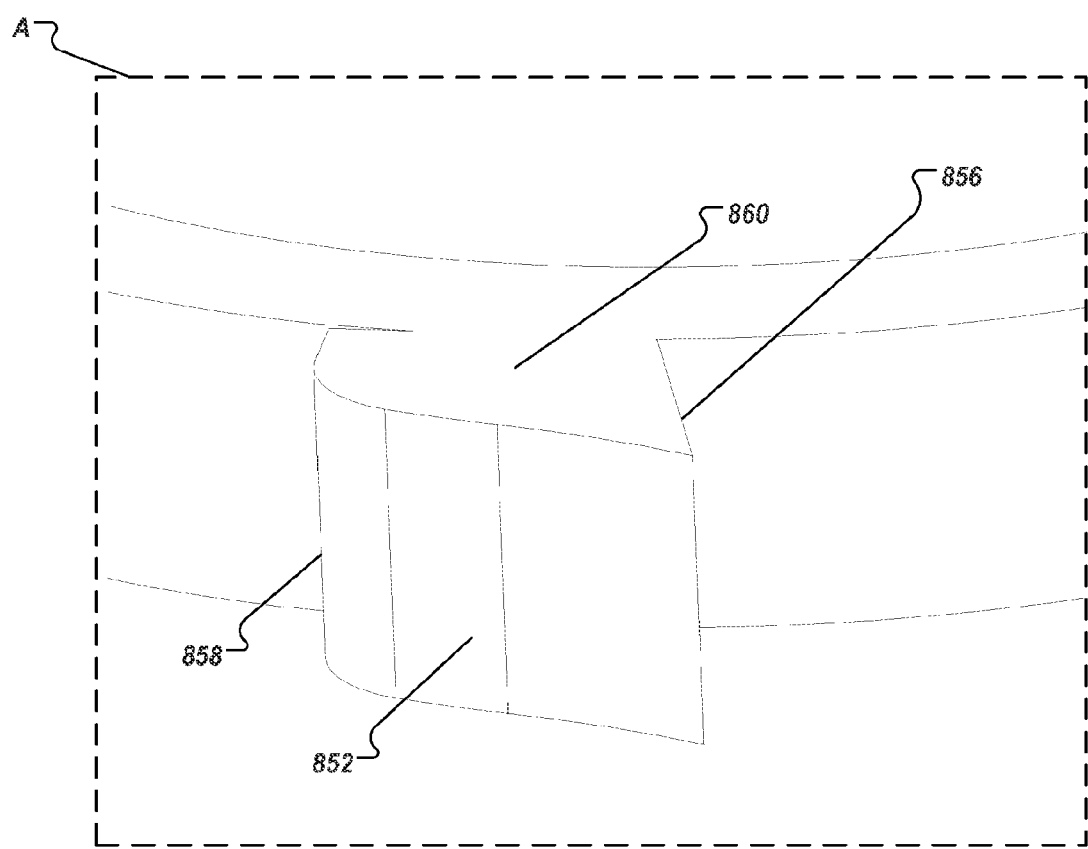

FIG. 8C is an enlarged view of the region of FIG. 8B indicated by the letter "A". The view includes one of the fixed locking blocks 860. The fixed locking block 860 includes a radially outward face 852, a radially leading face 856, and a radially trailing face 858. The radially leading face 856 is a generally planar surface arranged to contact the radially trailing face 758 of one of the moveable locking blocks 700 such that the faces 856 and 758 are substantially coplanar when in contact. The radially trailing face 858 and the radially outward face 852 are arranged in a tapered (e.g., wedge) or curved configuration such that the radially outward face 852 and the radially inward face 754 are substantially coplanar when in contact. The interactions among the faces 752-758 and 852-858 will be discussed further in the descriptions of FIGS. 14 and 15.

Figure 9:
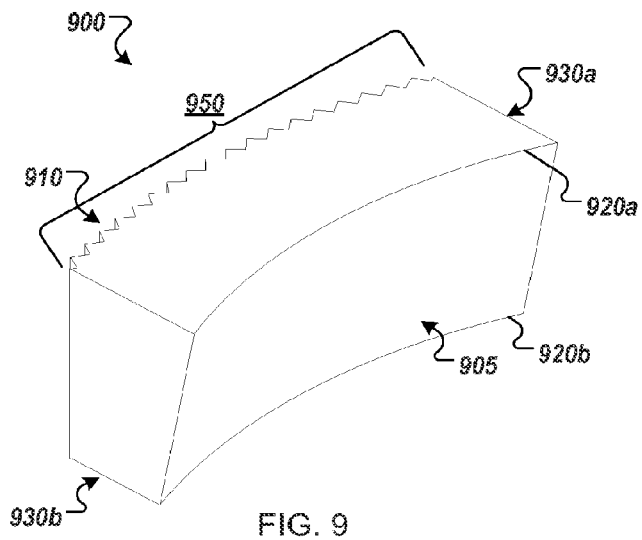
FIG. 9 is a perspective view of an example lower wicker pad.

FIG. 9 is a perspective view of an example of the collection of lower wicker pads 900. The lower wicker pad 900 is a section of a ring having an inner radial surface 905 and an outer radial surface 910. The outer radial surface has a taper from a first diameter 920a and first longitudinal end 930a to a second diameter 920b at a second longitudinal end 930b. The degree of this taper is substantially equal to a taper of the lower taper disk 1000. The wicker pad 900 includes a collection of longitudinal wickers 950 on the outer radial surface 910. In use, the longitudinal wickers 900 frictionally engage the stator 24. The longitudinal wickers 950 are compressed against the stator 24 when the lower taper disk 1000 is threaded into the locking disk 800. In some embodiments, four lower wicker pads 900 may be included in the anti-stall mechanism 300, although any appropriate number may be used.

Figure 10:
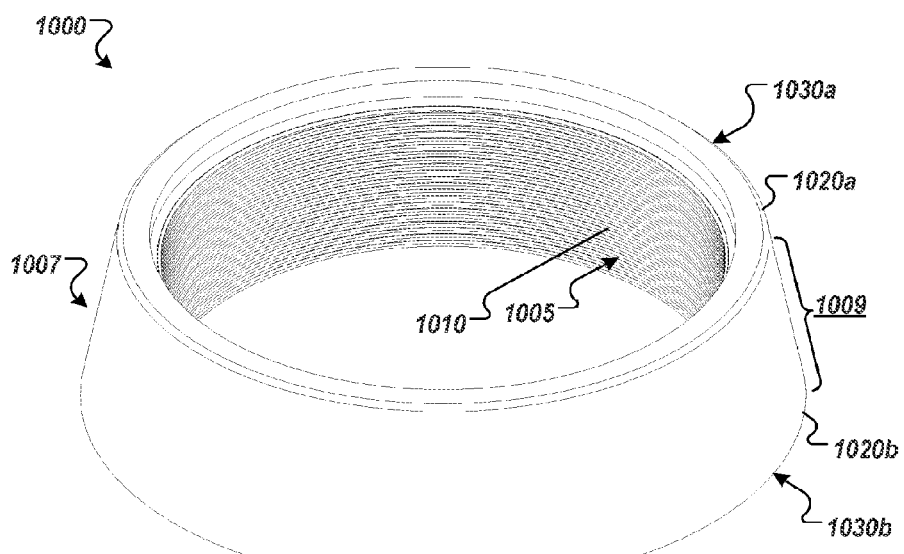
FIG. 10 is a perspective view of an example lower taper disk.

FIG. 10 is a perspective view of the example lower taper disk 1000. The lower taper disk 1000 is a ring with a collection of threads 1010 arranged upon an inner surface 1005. An outer surface 1007 of the lower taper disk 1000 is formed with a taper 1009 that progresses from a first diameter 1020a at a first longitudinal end 1030a and a second diameter 1020b larger than the first diameter 1020a at a second longitudinal end 1030b.

The threads 1010 are formed to mate with corresponding threads formed in the locking disk 800. A collection of torque holes (not shown) are formed in the second longitudinal end 430b. In some implementations, the torque holes may accept the insertion of a tool. For example, a spanner wrench may be inserted into the torque holes to rotate the lower taper disk 1000 to thread or unthread the lower taper disk 1000 to or from the locking disk 800. As the lower taper disk 1000 is assembled to the locking disk 800, the lower wicker pads 900 are compressed between the lower taper disk 1000 and the stator 24, causing the longitudinal wickers 1050 to frictionally engage the stator 24.

Figure 11:
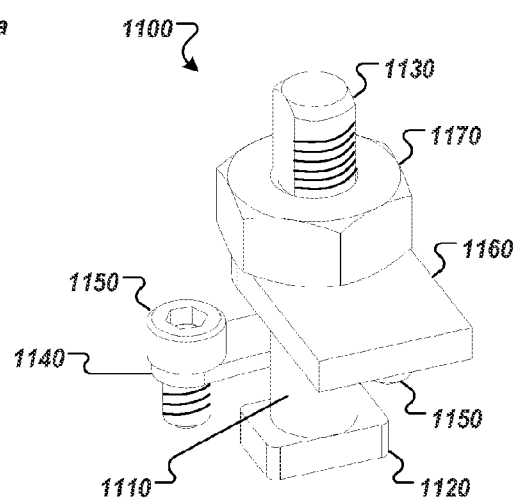
FIG. 11 is a perspective view of an example locking assembly.

FIG. 11 is a perspective view of one of the collection of the locking assemblies 1100. The locking assembly 1100 includes a longitudinal support 1110. The longitudinal support 1110 includes a flange 1120 at one end, a threaded section 1130 at the other end, and a fastener plate 1140 near its midpoint.

The flange 1120 is configured to fit into, and be at least partly constrained by, a corresponding one of the locking slots 616 or 816. The fastener plate 1140 is configured to align a collection of fasteners 1150 (e.g., bolts) with the fastener holes 617 or 817. A locking plate 1160 includes a bore (not shown) through which the threaded section 1130 is passed. A fastener 1170 (e.g., a nut) is threaded onto the threaded section 1130 to constrain the locking plate 1160 along the longitudinal length of the longitudinal support 1110.

Figure 12A:
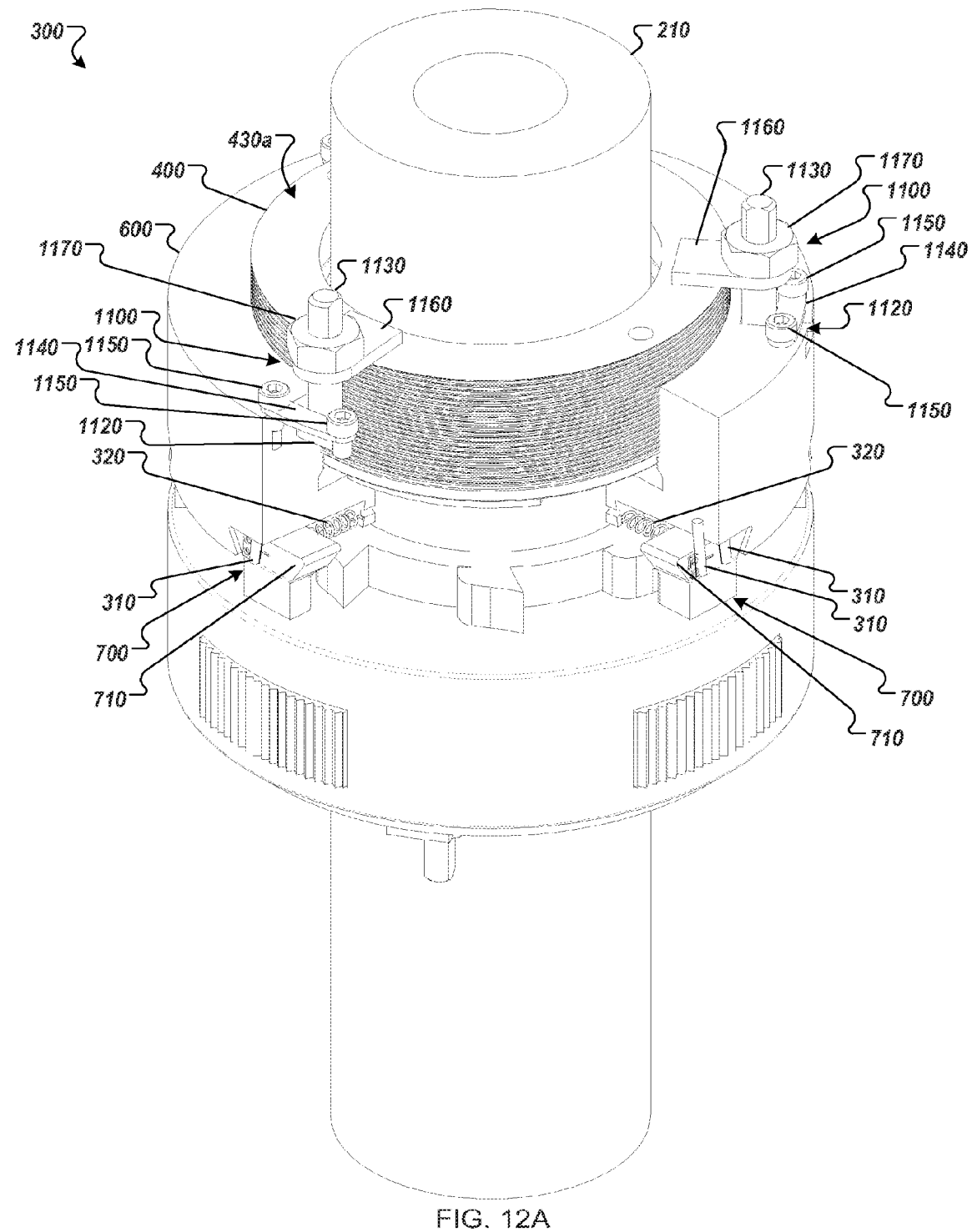
FIG. 12A is a partial cutaway perspective view of the example anti-stall mechanism.

FIG. 12A is a partial cutaway perspective view of the example anti-stall mechanism 300. Visible in this view are the driveshaft 210, the upper taper disk 400, the dovetail disk 600, several of the stopper pins 310, two of the springs 320, two of the moveable locking blocks 700, the locking disk 800, two of the lower wicker pads 900, and two of the locking assemblies 1100.

The moveable locking blocks 700 are shown assembled to the dovetail disk 600. In their assembled configuration, the dovetail sections 710 are longitudinally constrained by a dovetail slot 620. A corresponding one of the springs 320 is constrained between the dovetail disk 600 and the bore 712 (not visible in this view). The moveable locking blocks 700 are constrained from exiting the dovetail slots 620 by the stopper pins 310.

The locking assemblies 1100 are shown assembled to the dovetail disk 600. In their assembled configuration, the flanges 1120 are longitudinally constrained by the locking slots 616, and the locking assemblies 1100 are constrained radially by passing the fasteners 1150 through the fastener plates 1140 and into the fastener holes 617 (not visible in this view).

The locking plates 1160 are placed over the threaded sections 1130 and are brought into contact with the first longitudinal end 430a of the taper disk 400. The locking plates 1160 are removably constrained at these positions by threading the fasteners 1170 onto the threaded sections 1130 to bring the fasteners 1170 into contact with the locking plates 1160.

Figure 12B:
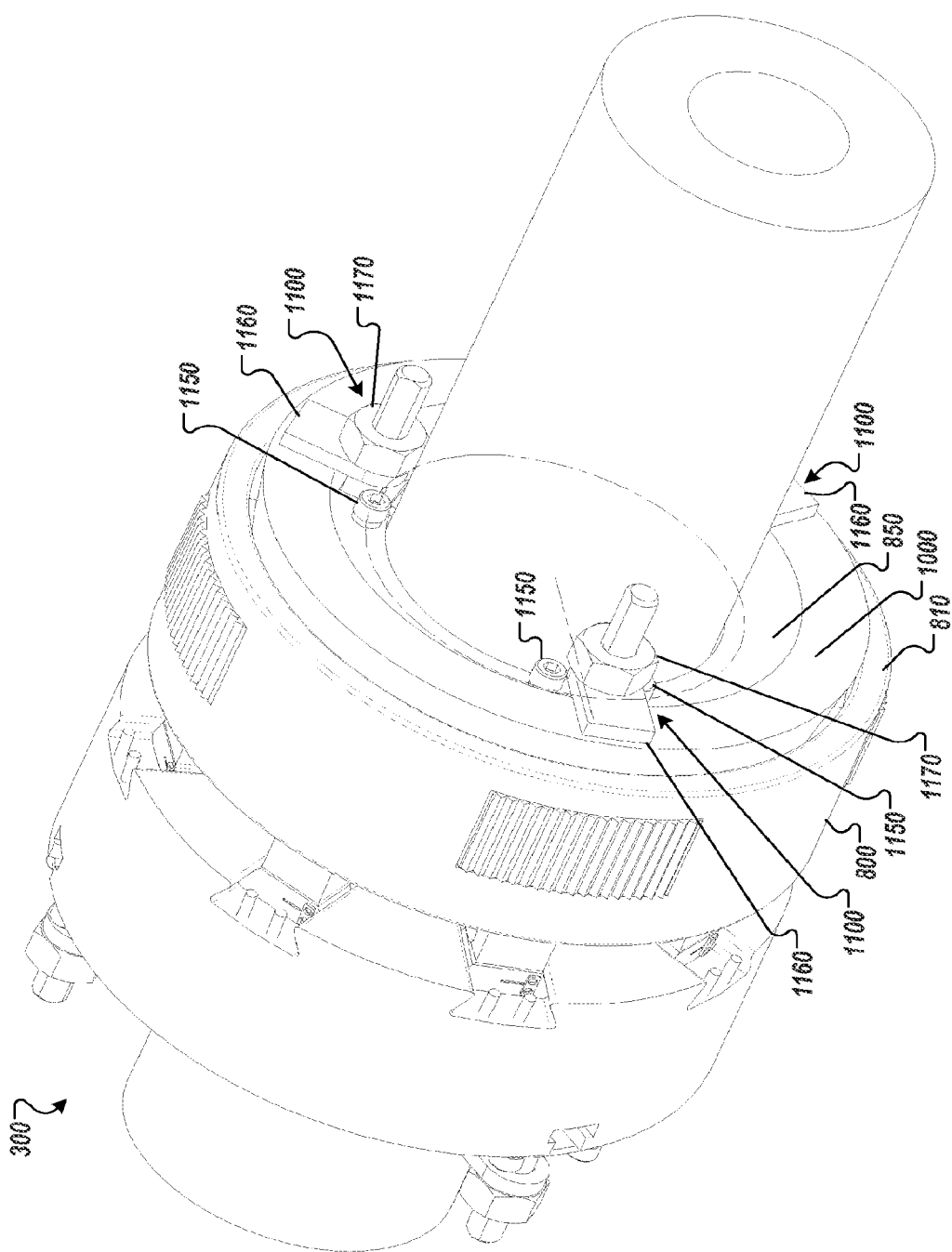
FIG. 12B is another perspective view of the example anti-stall mechanism.

FIG. 12B is another perspective view of the example anti-stall mechanism 300. In this view, it can be seen that the locking assemblies 1100 are assembled to the inner ring 850 of the locking disk 800 in a manner substantially similar to that described previously in regard to the locking assemblies 1100 and the dovetail disk 600. The fasteners 1170 removably maintain contact between the locking plates 1160 and the lower taper disk 1000.

FIG. 13A is a cross-sectional side view of an example anti-stall mechanism 300 in a disengaged configuration. The disengaged configuration is exhibited when the driveshaft 210 is rotating at a speed that imparts sufficient centrifugal force upon the moveable locking blocks 700 to overcome the centripetal force provided by the springs 320. Under such conditions, the moveable locking blocks 700 move radially outward to an orbit where the moveable locking blocks 700 do not contact the fixed locking blocks 860.

FIG. 13B is a cross-sectional side view of an example anti-stall mechanism in an engaged configuration. The engaged configuration is exhibited when the driveshaft 210 is rotating more slowly than the stator 24 and at a speed that imparts insufficient centrifugal force upon the moveable locking blocks 700 to overcome the centripetal force provided by the springs 320. Under such conditions, the moveable locking blocks 700 will move radially inward where they may come into radial contact with the fixed locking blocks 860.

Figure 14A:
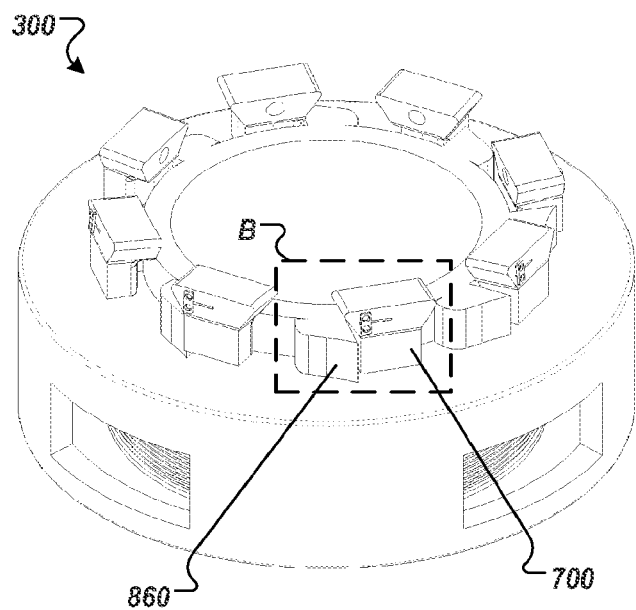
FIGS. 14A-14B are perspective views of an example anti-stall mechanism in an engaged configuration.
Figure 14B:
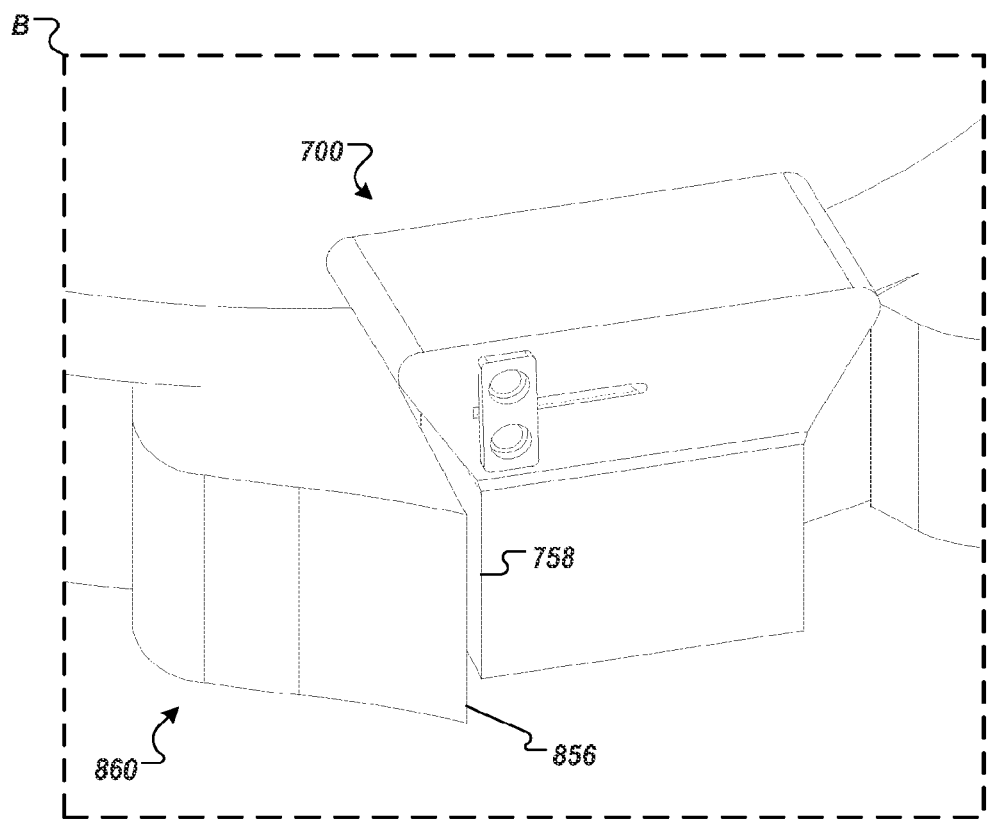

FIGS. 14A and 14B are perspective views of the example anti-stall mechanism 300 in an engaged configuration. Several elements of the anti-stall mechanism 300 are hidden in this view in order to better illustrate the relationships between the moveable locking blocks 700 and the fixed locking blocks 860. Referring to FIG. 14A, one of the moveable locking blocks 700 and one of the fixed locking blocks 860 are highlighted within a region generally designated as "B".

FIG. 14B is an enlarged view of the region "B" of FIG. 14A to better illustrate an example engagement between the moveable locking block 700 and the fixed locking block 860. In situations in which the driveshaft 210 is spinning at less than a predetermined speed, the moveable locking block 700 will move radially inward to the illustrated position. If the rotational speed of the driveshaft 210, and hence the moveable locking block 700, is also less than or equal to the rotational speed of the stator 24, and hence the fixed locking block 860, the radially leading face 856 will contact the radially trailing face 758.

The radially leading face 856 is a generally planar surface arranged to contact the radially trailing face 758 of one of the moveable locking blocks 700 such that the faces 856 and 758 are substantially coplanar when in contact. While in the engaged configuration, rotational energy from the stator 24 can be transferred to the driveshaft 210 through the fixed locking blocks 860 to the moveable locking blocks 700.

Figure 15A:
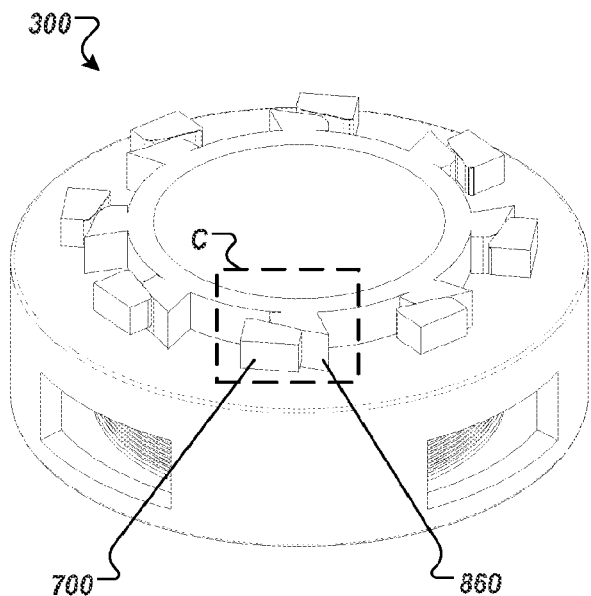
FIGS. 15A-15B are simplified perspective views of an example anti-stall mechanism exiting an engaged configuration.
Figure 15B:
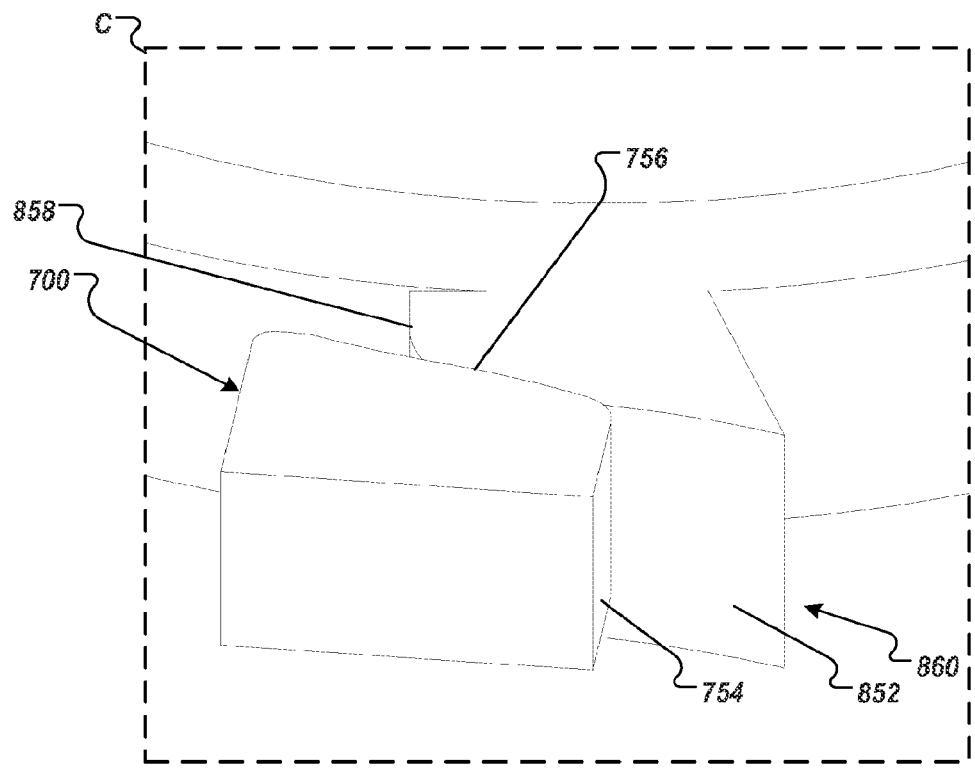

FIGS. 15A and 15B are simplified perspective views of the example anti-stall mechanism 300 exiting an engaged configuration. Several elements of the anti-stall mechanism 300 are hidden in this view in order to better illustrate the relationships between the moveable locking blocks 700 and the fixed locking blocks 860. Referring to FIG. 15A, one of the moveable locking blocks 700 and one of the fixed locking blocks 860 are highlighted within a region generally designated as "C".

FIG. 15B is an enlarged view of the region "C" of FIG. 15A to better illustrate an example disengagement between the moveable locking block 700 and the fixed locking block 860. In situations in which the rotational speed of the driveshaft 210, and hence the moveable locking block 700, is greater than the rotational speed of the stator 24, and hence the fixed locking block 860, the radially leading face 756 will contact the radially trailing face 858.

The radially leading face 756 and the radially trailing face 858 are configured such that contact between these two faces will urge the moveable block 700 radially outward. The radially trailing face 858 and the radially outward face 852 are arranged in a tapered (e.g., wedge) or curved configuration such that the radially outward face 852 and the radially inward face 754 are substantially coplanar when in sliding contact, and further urge the moveable block 700 outward and out of contact with the fixed locking block 860.

Figure 16:
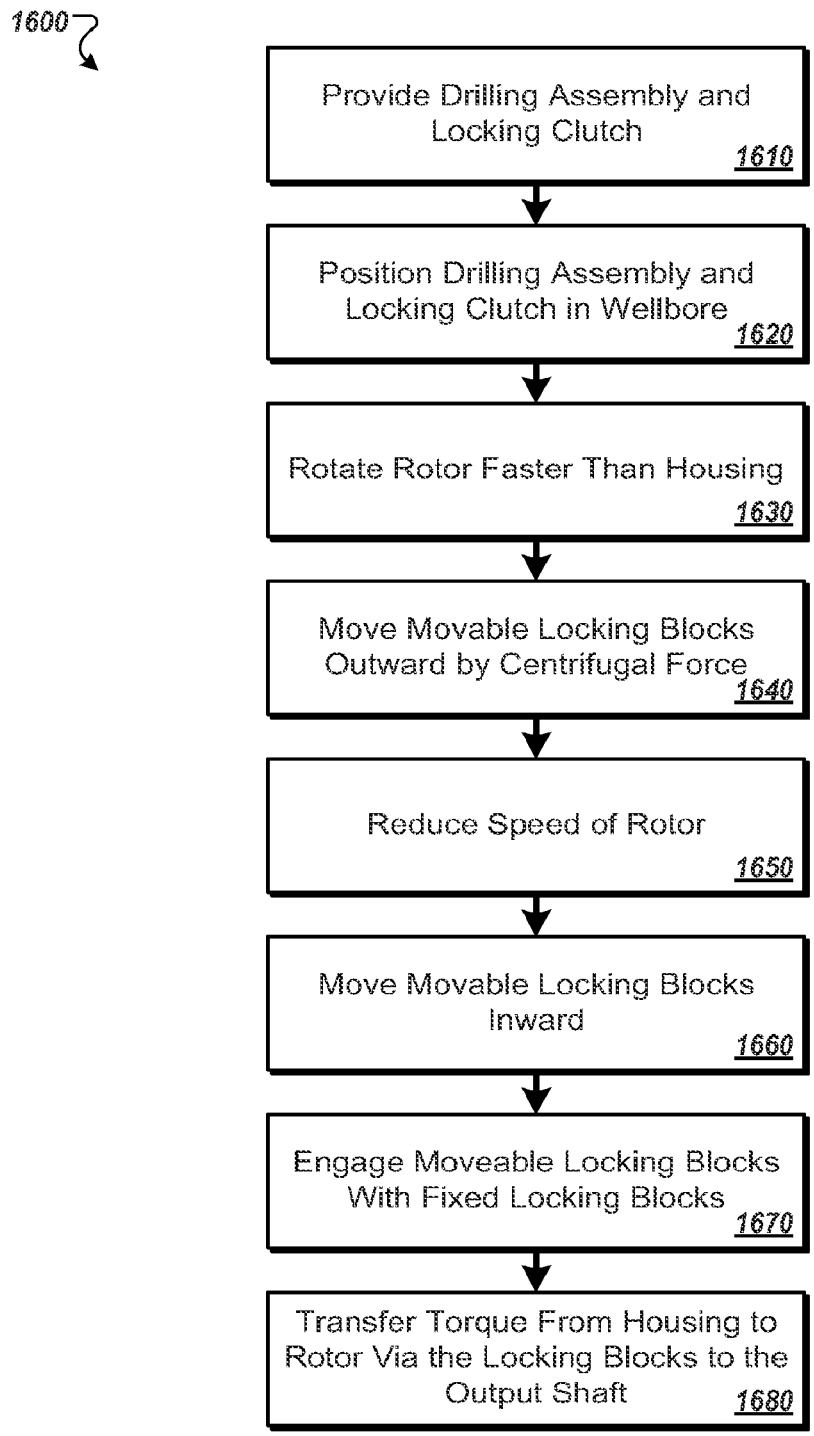
FIG. 16 is a flow diagram of an example process for the operation of an example anti-stall mechanism.

FIG. 16 is a flow diagram of an example process 1600 for the operation of an example anti-stall mechanism, such as the anti-stall mechanism 100 or 300 of FIG. 1 or 3. At 1610, a drilling assembly and a locking clutch are provided. The drilling assembly includes a rotatable housing coupled to a stator of a drilling motor positionable in a wellbore and a rotatable output shaft coupled to a driveshaft of the drilling motor, said rotatable output shaft having a central longitudinal axis aligned with a central longitudinal axis of the rotatable housing. The locking clutch includes a plurality of moveable locking blocks slidably coupled to the rotatable output shaft. The movable locking blocks are slidable radially inwardly and outwardly with respect to a central longitudinal axis of the rotatable output shaft, and are spaced apart circumferentially about the rotatable output shaft. Each of the locking blocks has a first contacting face and a second contacting face. A plurality of fixed locking blocks are coupled to the rotatable housing, and are positioned radially around the output shaft and spaced apart circumferentially about the interior of the rotatable housing a distance sufficient to receive one of the movable locking blocks when it moves inwardly toward the central axis of the rotatable output shaft. Each locking block has a first contacting face and a second contacting face. In some embodiments, the drilling assembly can be the driveshaft 210 and the stator 24 of FIG. 1, and the locking clutch can be the anti-stall mechanism 100 or 300.

At 1620, the drilling assembly and the locking clutch are positioned in the wellbore. For example, the drill string 20 and the anti-stall mechanism 100 can be lowered into the wellbore 60.

At 1630, the stator of the drilling motor is rotated at a first rotational speed. At 1640, the rotor of the drilling motor can be rotated relative to the stator of the drilling motor at a second rotational speed greater than the first speed. For example, the rotor 26 may be rotated relatively faster than the stator 24.

At 1640, the movable locking blocks are moved outwardly from the central axis of the rotatable output shaft by centrifugal force sufficient to overcome a biasing force applied by a biasing member to the movable locking blocks. For example, rotation of the driveshaft 210 may impart rotation of the dovetail disk 600 and the moveable locking blocks 700 that can cause centrifugal forces acting on the moveable locking blocks 700 to overcome the biasing force provided by the springs 320.

At 1650, the speed of rotation of the rotatable output shaft is reduced relative to that of the rotatable housing, resulting in reduced centrifugal force on the movable locking blocks. At 1660, the movable locking blocks are moved inwardly toward the central axis within the downwardly tapered dovetail joints with the biasing force applied to the movable locking blocks. For example, as the driveshaft 210 slows, the forces of gravity and/or the springs 320 may become relatively greater than the centrifugal forces acting upon the moveable locking blocks 700, causing them to move radially inward along the dovetail slots 620.

At 1670, the movable locking blocks are engaged with the fixed locking blocks. For example, in the engaged configuration illustrated in FIGS. 14A-14B, the moveable locking block 700 is engaged with the fixed locking block 860. At 1680, torque is transferred from the rotatable housing via the locking blocks to the rotatable output shaft. For example, while in the engaged configuration shown in FIGS. 13B and 14A-14B, rotational energy from the stator 24 can be transferred to the driveshaft 210 through the fixed locking blocks 860 to the moveable locking blocks 700.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A locking clutch to selectively transmit torque from a rotatable stator coupled to a drilling motor positionable in a wellbore and a rotatable output shaft coupled to a rotatable rotor of the drilling motor, said locking clutch comprising:
   a plurality of slidable locking blocks slidably coupled to the rotatable output shaft, said slidable locking blocks slidable radially inwardly and outwardly with respect to a central longitudinal axis of the rotatable output shaft, said slidable locking blocks spaced apart circumferentially about the rotatable output shaft, each of said slidable locking blocks having a first contacting face and a second contacting face; and
   a plurality of fixed locking blocks coupled to the rotatable stator, said fixed locking blocks positioned radially around the rotatable output shaft and spaced apart circumferentially about an interior of the rotatable stator a distance sufficient to receive one of the slidable locking blocks when it moves inwardly toward the central axis of the rotatable output shaft, each of said fixed locking blocks having a first contacting face and a second contacting face.

2. The locking clutch of claim 1 further including a dovetail disk coupled to the rotatable output shaft, said dovetail disk having a plurality of dovetail grooves, each of said grooves configured to slidably receive a dovetail extension of one of the slidable locking blocks.

3. The locking clutch of claim 2 wherein each of the dovetail grooves is inclined upward from a plane disposed perpendicular to the central axis of the rotatable output shaft.

4. The locking clutch of claim 1 further including a biasing member coupled to each of the slidable locking blocks, said biasing member configured to slidably move each of the slidable locking members inwardly toward the central longitudinal axis of a rotatable output shaft when centrifugal force acting on each of the slidable locking block is reduced.

5. The locking clutch of claim 2 wherein the dovetail disk further includes a plurality of first circumferential threads about an inner radial surface, and the locking clutch further including:
   a first taper disk having a plurality of second circumferential threads about an outer radial surface and formed to be threadably mated with the first circumferential threads, and a tapered inner radial surface having a first diameter at a first longitudinal end and a second diameter different from the first diameter at a second longitudinal end opposite the first longitudinal end; and,
   a first wicker pad having a tapered outer radial surface having a third diameter at a third longitudinal end and a fourth diameter different from the third diameter at a fourth longitudinal end opposite the third longitudinal end, and an inner radial surface having a plurality of longitudinal grooves and peaks, the peaks sized to contact an outer radial surface of the rotatable output shaft.

6. The locking clutch of claim 1 further including a locking disk coupled to the rotatable stator, said locking disk having the plurality of fixed locking blocks positioned radially about a longitudinal end face of the locking disk.

7. The locking clutch of claim 6 wherein the locking disk further includes a plurality of third circumferential threads about an inner radial surface, and the locking clutch further including:
   a second taper disk having a plurality of fourth circumferential threads about an inner radial surface and formed to be threadably mated with the third circumferential threads, and a tapered outer radial surface having a fifth diameter at a fifth longitudinal end and a sixth diameter different from the fifth diameter at a sixth longitudinal end opposite the fifth longitudinal end; and a second wicker pad having a tapered inner radial surface having a seventh diameter at a seventh longitudinal end and an eighth diameter different from the seventh diameter at an eighth longitudinal end opposite the seventh longitudinal end, and an outer radial surface having a plurality of longitudinal grooves and peaks, the peaks sized to contact an inner radial surface of the rotatable stator.

8. The locking clutch of claim 1, wherein:

the first contacting face of each slidable locking block and the first contacting face of each fixed locking block are oriented to promote engagement between the slidable locking blocks and the fixed locking blocks when the first contacting face of each slidable locking block and the first contacting face of each fixed locking block are in contact; and, the second contacting face of each slidable locking block and the second contacting face of each fixed locking block are oriented to urge a corresponding slidable locking block to move outwardly away from the central axis of the rotatable output shaft and promote disengagement of the slidable locking blocks from the fixed locking blocks when the second contacting face of each slidable locking block and the second contacting face of each fixed locking block are in contact.

9. The locking clutch of claim 1, wherein the drilling motor is a positive displacement Moineau type motor, wherein the rotatable stator of the locking clutch is coupled to the housing of the drilling motor and the rotatable output shaft is coupled to the rotatable rotor of the drilling motor.

10. The locking clutch of claim 1, wherein the drilling motor is turbine type motor, wherein the rotatable stator of the locking clutch is coupled to the housing of the drilling motor and the rotatable output shaft is coupled to the rotatable rotor of the drilling motor.

11. A method of selectively transmitting torque from a rotatable stator to a rotatable output shaft positioned in a wellbore, said method comprising:

providing a drilling assembly including:
a rotatable housing coupled to a drilling motor positionable in a wellbore and a rotatable output shaft coupled to a rotatable rotor of the drilling motor, said rotatable output shaft having a central longitudinal axis aligned with a central longitudinal axis of the rotatable stator;

providing a locking clutch including:
a plurality of slidable locking blocks slidably coupled to the rotatable output shaft, said slidable locking blocks slidable radially inwardly and outwardly with respect to a central longitudinal axis of the rotatable output shaft, said slidable locking blocks spaced apart circumferentially about the rotatable output shaft, each of said locking blocks having a first contacting face and a second contacting face; and, a plurality of fixed locking blocks coupled to the rotatable stator, said fixed locking blocks positioned radially around the output shaft and spaced apart circumferentially about the interior of the rotatable stator a distance sufficient to receive one of the slidable locking blocks when it moves inwardly toward the central axis of the rotatable output shaft, each said locking block having a first contacting face and a second contacting face;

positioning the drilling assembly and the locking clutch in the wellbore;

rotating the rotatable stator at a first rotational speed;

rotating the rotatable rotor of the drilling motor relative to the rotatable stator at a second rotational speed greater than the first speed; and, moving the slidable locking blocks outwardly from the central axis of the rotatable output shaft by centrifugal force sufficient to overcome a biasing force applied by a biasing member to the slidable locking blocks.

12. The method of claim 11 further comprising:

reducing the speed of rotation of the rotatable output shaft relative to the rotatable stator resulting in reduced centrifugal force on the slidable locking blocks; and moving the slidable locking blocks inwardly toward the central axis within a downwardly tapered dovetail joints with the biasing force applied to the slidable locking blocks.

13. The method of claim 12 further comprising:

engaging the slidable locking blocks with the fixed locking blocks;

transferring torque from the rotatable stator via the locking blocks to the rotatable output shaft.

14. The method of claim 12 further including moving the slidable locking blocks out of the locked position to allow the rotatable rotor of the drilling motor to rotate independent of the rotatable stator.

15. The method of claim 11, wherein the drilling motor is a positive displacement type motor, wherein the rotatable stator of the locking clutch is coupled to the rotatable stator of the drilling motor and the rotatable output shaft is coupled to the rotatable rotor of the drilling motor.

16. The method of claim 11, wherein the drilling motor is turbine type motor, wherein the rotatable stator of the locking clutch is coupled to the housing of the drilling motor and the rotatable output shaft is coupled to the rotatable rotor of the drilling motor.

* * * * *